United States Patent
Wentland et al.

(10) Patent No.: US 11,346,611 B2
(45) Date of Patent: May 31, 2022

(54) HEAT EXCHANGERS WITH MULTIPLE FLOW CHANNELS

(71) Applicant: Hamilton Sundstrand Corporation, Charlotte, NC (US)

(72) Inventors: William L. Wentland, Rockford, IL (US); Eric Karlen, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 253 days.

(21) Appl. No.: 15/238,513

(22) Filed: Aug. 16, 2016

(65) Prior Publication Data
US 2018/0051934 A1    Feb. 22, 2018

(51) Int. Cl.
| F28D 7/00 | (2006.01) |
| F28D 7/02 | (2006.01) |
| F28F 7/02 | (2006.01) |
| F28F 21/08 | (2006.01) |

(52) U.S. Cl.
CPC .......... *F28D 7/0016* (2013.01); *F28D 7/024* (2013.01); *F28F 7/02* (2013.01); *F28F 21/081* (2013.01); *F28F 2255/18* (2013.01); *F28F 2275/06* (2013.01)

(58) Field of Classification Search
CPC . F28D 7/02; F28D 7/024; F28D 7/026; F28D 15/046; F28F 2255/18
USPC ...................................................... 165/156
See application file for complete search history.

(56) References Cited

U.S. PATENT DOCUMENTS

| 2,260,904 A | * | 10/1941 | Horton | B60S 1/487 239/130 |
| 2,409,304 A | * | 10/1946 | Morrison | E03B 7/10 138/111 |
| 2,611,585 A | * | 9/1952 | Boling | F28D 7/0016 165/164 |
| 2,987,767 A | * | 6/1961 | Cichelli | B29C 48/10 264/565 |
| 3,359,753 A | * | 12/1967 | Fiedler | B01D 53/265 62/317 |

(Continued)

FOREIGN PATENT DOCUMENTS

| CN | 103292620 A | 9/2013 |
| FR | 2592686 A1 | 7/1987 |

(Continued)

OTHER PUBLICATIONS

Extended European Search Report, of the European Patent Office, dated Jan. 24, 2018 in corresponding European Patent Application No. 17186478.8.

(Continued)

*Primary Examiner* — Jianying C Atkisson
*Assistant Examiner* — For K Ling
(74) *Attorney, Agent, or Firm* — Locke Lord LLP; Daniel J. Fiorello; Gabrielle L. Gelozin

(57) ABSTRACT

A heat exchanger can include a monolithically formed body defining at least two channels configured to allow fluid to flow therethrough, at least one of the at least two channels at least partially wrapping around or within at least one other of the at least two channels. In certain embodiments, the at least two channels can include a first channel and a second channel, wherein the first channel is at least partially wound around or within the second channel.

14 Claims, 2 Drawing Sheets

(56) References Cited

U.S. PATENT DOCUMENTS

| | | | | |
|---|---|---|---|---|
| 3,513,908 | A | * | 5/1970 | Singh ................... F28D 7/024 138/38 |
| 3,563,212 | A | * | 2/1971 | Hoagland ............... F22B 27/14 122/250 R |
| 3,704,748 | A | * | 12/1972 | Hapgood ................ F28D 7/024 165/165 |
| 3,899,031 | A | * | 8/1975 | Laessig .................. F22B 27/08 122/250 R |
| 4,277,322 | A | * | 7/1981 | Kane .................. G01N 27/4077 204/408 |
| 5,020,319 | A | * | 6/1991 | Matsuura ............... F01N 3/046 123/193.5 |
| 5,597,589 | A | * | 1/1997 | Deckard ................ B33Y 40/00 264/401 |
| 7,756,404 | B2 | * | 7/2010 | Schubert ................ F28D 7/026 392/478 |
| 9,134,072 | B2 | | 9/2015 | Roisin et al. |
| 2011/0247354 | A1 | * | 10/2011 | Asai .................... F24F 5/0046 62/324.6 |
| 2013/0126119 | A1 | | 5/2013 | Machet et al. |
| 2016/0025422 | A1 | | 1/2016 | Strange et al. |
| 2016/0116218 | A1 | | 4/2016 | Shedd et al. |

FOREIGN PATENT DOCUMENTS

| | | |
|---|---|---|
| JP | 2003-021476 A | 1/2003 |
| JP | 2005076915 A | 3/2005 |
| JP | 2008121908 A | 5/2008 |
| JP | 2009281711 A | 12/2009 |
| JP | 2015059715 A | 3/2015 |
| WO | WO-2016057443 A1 | 4/2016 |

OTHER PUBLICATIONS

Communication Pursuant to Article 94(3) EPC, of the European Patent Office, dated Nov. 23, 2018, issued in corresponding European Patent Application No. 17186478.8.

European Office Action issued in corresponding EP application No. 17186478.8, dated Jul. 2, 2020.

European Office Action issued in corresponding EP application No. 17186478.8, dated Dec. 10, 2019.

* cited by examiner

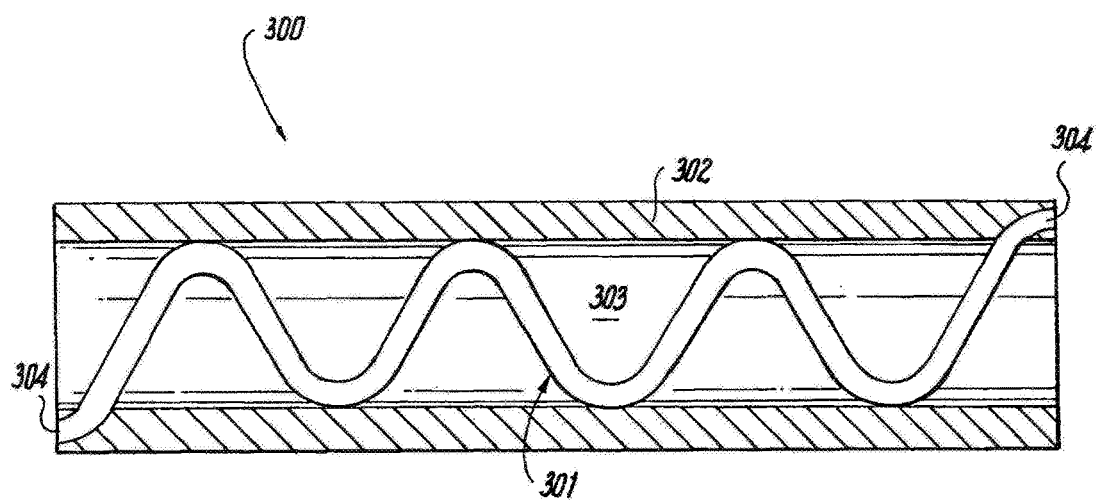
Fig. 3
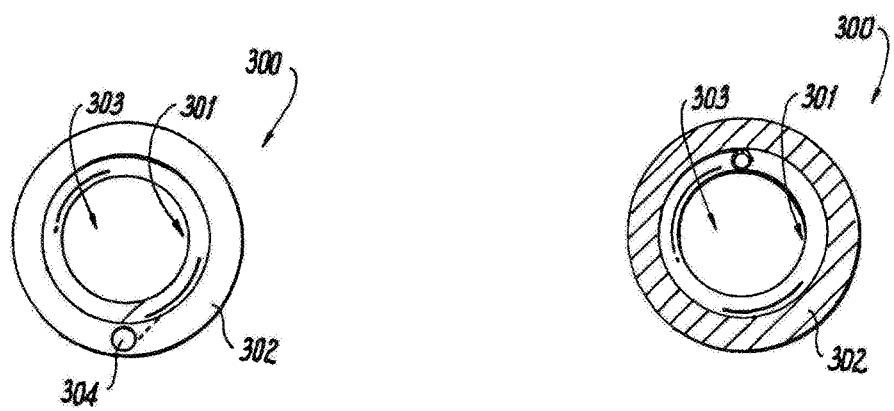
Fig. 4A  Fig. 4B

HEAT EXCHANGERS WITH MULTIPLE FLOW CHANNELS

BACKGROUND

1. Field

The present disclosure relates to heat exchangers, more specifically to heat exchangers having multiple channels.

2. Description of Related Art

In certain heat exchanger systems, two different fluids can be used. One fluid can cool and/or heat the other fluid. Existing structures have traditionally had limited complexity in their design, and thus have not fully maximized thermal efficiency.

Such conventional methods and systems have generally been considered satisfactory for their intended purpose. However, there is still a need in the art for improved heat exchangers. The present disclosure provides a solution for this need.

SUMMARY

A heat exchanger can include a monolithically formed body defining at least two channels configured to allow fluid to flow therethrough, at least one of the at least two channels at least partially wrapping around or within at least one other of the at least two channels. In certain embodiments, the at least two channels can include a first channel and a second channel, wherein the first channel is at least partially wound around or within the second channel.

The first channel can be helically wound around the second channel, for example. The first channel can be non-helically wound also or in any other suitable manner.

In certain embodiments, the first channel can be wound around the second channel outside of the second channel. In certain embodiments, the first channel can be wound around the second channel inside the second channel such that fluid within the second channel contacts an outer wall of the first channel.

The second channel can be straight. In certain embodiments, the second channel can be cylindrical in shape (e.g., having a circular cross-section). Any other suitable shape is contemplated herein.

The body can be formed of metal or any other suitable material. In certain embodiments, the body can be laser sintered, for example. Any other suitable method can be used to form the body (e.g., electron-beam welding)

A method of forming a heat exchanger includes monolithically forming a body to define at least two channels configured to allow fluid to flow therethrough, at least one of the at least two channels at least partially wrapping around or within at least one other of the at least two channels. In certain embodiments, forming the body to define at least two channels includes defining a first channel and a second channel such that the first channel is wound around or within the second channel. Forming the body can include forming the first channel such that the first channel is helically or non-helically wound around the second channel.

Forming the body can include forming the first channel such that the first channel is wound around the second channel outside of the second channel. Forming the body can include forming the first channel such that the first channel is wound around the second channel inside the second channel such that fluid within the second channel contacts an outer wall of the first channel.

Forming the body can include forming the second channel such that the second channel is straight. In certain embodiments, forming the body can include forming the second channel such that the second channel is cylindrical in shape.

In certain embodiments, forming the body can include forming the body from metal powder. Forming the body includes laser sintering metal powder.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 3 is a side, partially cross-sectional view of an embodiment of a heat exchanger in accordance with this disclosure, showing a first flow channel wrapped inside a second flow channel, the second flow channel shown in cross-section;

FIG. 4A is a plan view of the embodiment of FIG. 3; and

FIG. 4B is a sectional view of the embodiment of FIG. 3.

DETAILED DESCRIPTION

Figure 1:
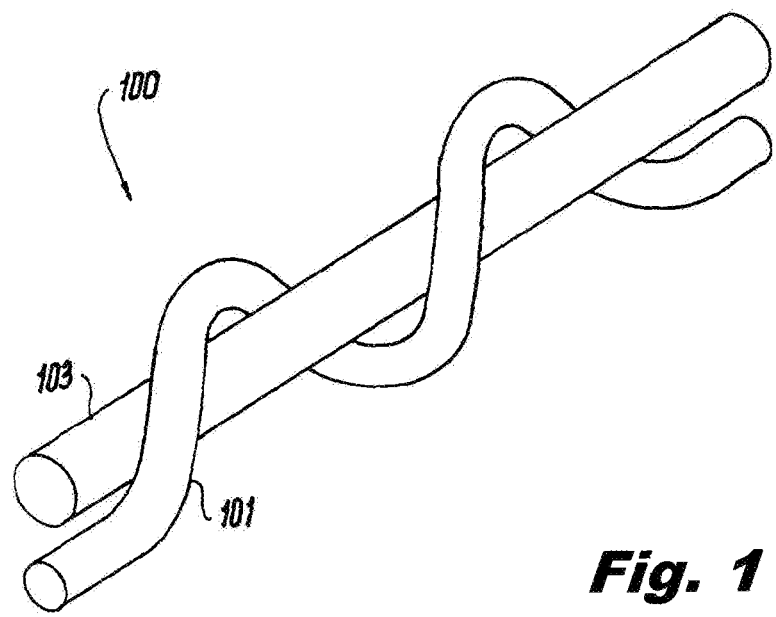
FIG. 1 is a perspective view of a flow volume (inverse of structure) of an embodiment of a heat exchanger in accordance with this disclosure, showing a first channel wrapped around a second channel.

Reference will now be made to the drawings wherein like reference numerals identify similar structural features or aspects of the subject disclosure. For purposes of explanation and illustration, and not limitation, an illustrative view of an embodiment of a heat exchanger in accordance with the disclosure is shown in FIG. 1 and is designated generally by reference character 100. Other embodiments and/or aspects of this disclosure are shown in FIGS. 2A-4. The systems and methods described herein can be used to enhance thermal efficiency of heat exchangers.

Figure 2A:
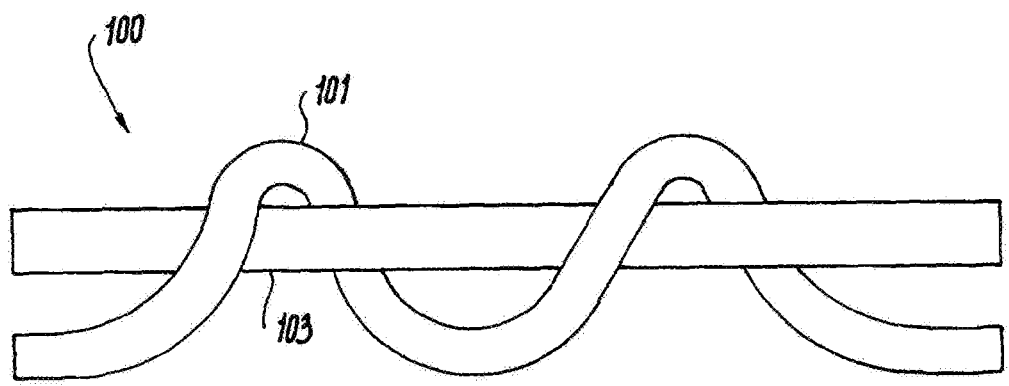
FIG. 2A is a side view of the embodiment of FIG. 1.
Figure 2B:
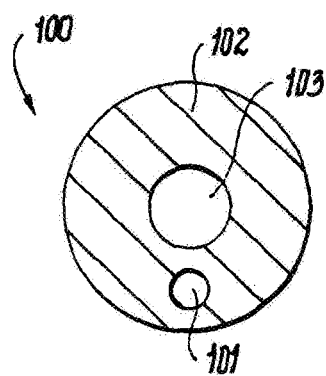
FIG. 2B is a sectional view of the embodiment of FIG. 1.

Referring to FIGS. 1, 2A, and 2B, a heat exchanger 100 can include a monolithically formed body 102 defining at least two channels configured to allow fluid to flow therethrough. At least one of the at least two channels at least partially wraps around or within at least one other of the at least two channels. In certain embodiments, the at least two channels can include at least a first channel 101 and a second channel 103. Any other suitable number of channels (e.g., third, further, fifth, etc.) is contemplated herein. The body 102 is not shown in FIGS. 1 and 2A because the first and second channels 101, 103 are shown in inverse for clarity. The body 102a can be any suitable shape or size, and made for any suitable application.

At least the first channel 101 can be at least partially wound around or within the second channel 103, or at least the second channel 103 can be at least partially wound around or within the first channel 101, or at least the first channel 101 and the second channel 013 can be at least partially wound around each other. For example, the first channel 101 can be helically or non-helically wound around the second channel 103, as shown, or vice versa. Any other type of winding is contemplated herein, and the first channel 101 need not be smooth. The first channel 101 and the second channel 103 are fluidly isolated from each other and/or can have any suitable shape (e.g., helical, non-helical, straight, etc.).

In certain embodiments, the first channel 101 can be wound around the second channel 103 outside of the second channel 103 as shown in FIGS. 1-2B. Referring to FIGS. 3 and 4, in certain embodiments, a heat exchanger 300 can include a body 302 that defines a first channel 301 that is wound within body 302 to form a second channel 303 such that fluid within the second channel 303 contacts an outer wall of the first channel 301.

The first channel 301 and the second channel 303 are fluidly isolated from each other. The first channel 301 can terminate into the body 302 as shown in FIG. 3 to create outlets 304, for example.

The second channel 103, 303 can be straight or any other suitable shape (e.g., curved). In certain embodiments, the second channel 103, 303 can be cylindrical in shape (e.g., have a circular cross-section). Any other suitable shape is contemplated herein.

The body 102, 302 can be formed of metal (e.g., Cu, Ni alloy, Al, Ti alloy) or any other suitable material. In certain embodiments, the body 102, 302 can be laser sintered.

A method of forming a heat exchanger includes monolithically forming a body 102, 302 to define at least two channels configured to allow fluid to flow therethrough, at least one of the at least two channels at least partially wrapping around or within at least one other of the at least two channels. In certain embodiments, forming the body to define at least two channels can include defining a first channel 101, 301 and a second channel 103, 303 such that the first channel 101, 301 is at least partially wound around or within the second channel 103, 303. Forming the body 102, 302 can include forming the first channel 101, 301 such that the first channel 101, 301 is helically wound around the second channel 103, 303.

Forming the body 102 can include forming the first channel 101 such that the first channel 101 is wound around the second channel 103 outside of the second channel 103. Forming the body 302 can include forming the first channel 301 such that the first channel 301 is wound around the second channel 303 inside the second channel 303 such that fluid within the second channel 303 contacts an outer wall of the first channel 301.

Forming the body 102, 302 can include forming the second channel 103, 303 such that the second channel 103, 303 is straight. In certain embodiments, forming the body 102, 302 can include forming the second channel 103, 303 such that the second channel 103, 303 is cylindrical in shape.

In certain embodiments, forming the body 102, 302 can include forming the body 102, 302 from metal powder. Forming the body 102, 302 can include laser sintering metal powder.

Embodiments as described above can be used for cooling and/or heating applications. While embodiments are shown having two channels, any suitable number of fluidly isolated channels is contemplated herein (e.g., two helical first channels around a second channel to form a double helix). Flow can be passed through the first and second channels in a concurrent direction or a different direction. The first channel can be wrapped around the second channel as tightly (amount of winds per unit length of the second channel) as is suitable.

Additive manufacturing allows unique configurations that cannot be produced in current machining practices. Embodiments as described herein include internal passages that allow flow of two different fluids around each other.

The methods and systems of the present disclosure, as described above and shown in the drawings, provide for heat exchangers with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A heat exchanger, comprising:
a monolithically formed body defining at least a first channel and a second channel configured to allow fluid to flow therethrough, at least one of the first channel and/or second channel at least partially wrapping within at least one other of the at least first channel and/or second channel, wherein the first channel is wound within the second channel inside the second channel such that fluid within the second channel contacts an outer wall of the first channel, and wherein an inlet and/or outlet of the first channel terminates at an inner surface of the body at an opening defined by the body.

2. The heat exchanger of claim 1, wherein the first channel is helically or non-helically wound around the second channel.

3. The heat exchanger of claim 1, wherein the second channel is straight.

4. The heat exchanger of claim 1, wherein the second channel is cylindrical in shape.

5. The heat exchanger of claim 1, wherein the body is formed of metal.

6. The heat exchanger of claim 1, wherein the body is laser sintered or electron-beam welded.

7. A method of forming a heat exchanger, comprising monolithically forming a body to define at least a first channel and a second channel configured to allow fluid to flow therethrough, at least one of the first channel and/or second channel at least partially wrapping within at least one other of the at least first channel and/or second channel, wherein forming the body to define the at least first channel and the second channel includes defining the first channel and the second channel such that the first channel is wound within the second channel inside the second channel such that fluid within the second channel contacts an outer wall of the first channel, and wherein an inlet and/or outlet of the first channel terminates at an inner surface of the body at an opening defined by the body.

8. The method of claim 7, wherein forming the body includes forming the first channel such that the first channel is helically or non-helically wound around the second channel.

9. The method of claim 7, wherein forming the body includes forming the second channel such that the second channel is straight.

10. The method of claim 7, wherein forming the body includes forming the second channel such that the second channel is cylindrical in shape.

11. The method of claim 7, wherein forming the body includes forming the body from metal powder.

12. The method of claim 7, wherein forming the body includes laser sintering metal powder.

13. The heat exchanger of claim 1, wherein an outer surface of the first channel contacts an inner diameter surface of the second channel.

14. A heat exchanger, comprising:
a monolithically formed body defining at least a first channel and a second channel configured to allow fluid to flow therethrough, at least one of the first channel and/or second channel at least partially wrapping within at least one other of the at least first channel and/or second channel, wherein the first channel is wound within the second channel inside the second channel such that fluid within the second channel contacts an outer wall of the first channel, and wherein a first opening of the first channel terminates into the body at a first side of the body, and a second opening of the first channel terminates into the body at an opposite side of the body relative to the first opening.

* * * * *